United States Patent [19]
Ekhoff

[11] Patent Number: 5,327,312
[45] Date of Patent: Jul. 5, 1994

[54] ROTARY ACTUATOR HAVING CANTILEVERED ROTATIONAL AXIS

[76] Inventor: Donald L. Ekhoff, 2600 Day Rd., Gilroy, Calif. 95020

[21] Appl. No.: 19,264

[22] Filed: Feb. 16, 1993

[51] Int. Cl.⁵ .............................................. G11B 5/55
[52] U.S. Cl. .................................................. 360/106
[58] Field of Search ........................ 360/104, 106, 109

[56] References Cited

U.S. PATENT DOCUMENTS

| | | | |
|---|---|---|---|
| 4,745,504 | 5/1988 | Foote | 360/106 |
| 4,775,907 | 10/1988 | Shtipelman | 360/106 |
| 4,811,144 | 3/1989 | Miller | 360/106 |
| 4,860,137 | 8/1989 | Shtipelman | 360/106 |
| 4,862,302 | 8/1989 | Ekhoff | 360/105 |
| 4,893,206 | 1/1990 | Shtipelman | 360/106 |
| 4,995,025 | 2/1991 | Schulze | 360/106 |
| 5,048,005 | 9/1991 | Ekhoff | 369/270 |

*Primary Examiner*—A. J. Heinz
*Attorney, Agent, or Firm*—Schneck & McHugh

[57] ABSTRACT

An actuator having a rotary arm having a read/write head on one side of an axis of rotation and a drive mechanism for defining the axis of rotation, with the drive mechanism being on the side of the axis opposite to the read/write head. The rotary arm has a supported portion and a cantilevered portion. Along the supported portion is an arcuate bearing surface that determines the location of the axis of rotation. The axis is beyond the extent of the supported portion and is spaced apart from any pivot-defining structure. A stepper motor is coupled to the arcuate bearing surface in a manner to frictionally drive the supported portion of the rotary arm. In addition to rotational movement, the arm is mounted for linear movement.

17 Claims, 3 Drawing Sheets

ROTARY ACTUATOR HAVING CANTILEVERED ROTATIONAL AXIS

DESCRIPTION

1. Technical Field

The present invention relates generally to information recording and reproducing on a disk and more particularly to devices for positioning a read/write head relative to a memory disk.

2. Background Art

In magnetic memory disks, information is recorded in concentric tracks on both sides of the disk. Read/write heads are moved to a particular track to gain access to the information recorded in that track. The tracks on a side of a magnetic disk are extremely closely fit, making it difficult to meet the requirement of high-speed movement of the head. The requirement of head movement within a 15 microsecond time window is typical.

Track seeking is often provided by a linear actuator that moves the heads radially along the opposite sides of the memory disk. Thus, the heads and the structure which electrically and mechanically operates the heads move across the disk in a straight-line manner.

The trend is to utilize rotary actuators for track seeking, rather than linear actuators. A rotary actuator mounts the heads at the end of an arm assembly that is pivoted at an end opposite to the heads. U.S. Pat. No. 4,862,302 to Ekhoff describes a rotary actuator. The heads are moved about the maximum radius of the apparatus, so that higher acceleration can be gained for quick access to the desired information. Moreover, the end of the arm supporting the heads presents less inertial resistance to movement than the structure that typically must be displaced during operation of a linear actuator. Consequently, more rapid acceleration and deceleration from one position to another is possible.

Another trend is to reduce the size of magnetic memory disks. High-capacity hard disks having an outside diameter of 34 mm are presently being used. Smaller disks present difficulties to manufactures, testers and users. The difficulties associated with disks of smaller geometries may be greatest for designers of test equipment for disks which are to be used with a rotary actuator. Preferably, the testing is performed in the same operational manner as the end use. That is, a rotary tester is preferred. However, with the small-diameter disks, the drive and the pivot assemblies must be very close to the spindle that is used to hold and rotate the disk, since a distant pivot would not provide the proper arcuate path of the read/write head along the disk to be read. The drive and pivoting structure for the movement of the read/write head may need to be partially located beneath the small-diameter disk, thereby requiring a long disk-supporting spindle. This puts greater demands on the manufacturer of the spindle and assembly for driving the spindle, since the increased length will enhance any spin errors.

In the testing of disks, assemblies for changing the path of the read/write heads and for loading and unloading the heads may also be needed. For example, the arc of the heads along a disk having an outside diameter of 34 mm will be different than that of a smaller and also that of a larger disk. Thus, a versatile disk tester will be one that allows adjustment of the arc radius of the heads. Loading and unloading the heads is the ability to bring the heads into and out of magnetic communication with the disk so that the data can be read or written. U.S. Pat. No. 4,862,302 to Ekhoff teaches an air bladder apparatus for loading and unloading a read/write head. The addition of structure for arc adjustment and head loading will only add to the length of the spindle for rotating the disk.

Another difficulty involves refurbishing or changing the read/write heads. As the head-support structure is moved closer to the spindle and the drive for the spindle, removing the heads becomes more difficult. Thus, an important consideration in the design of test equipment is the provision for unobstructed release of the read/write heads.

It is an object of the present invention to provide a rotary actuator having a center of head rotation that is proximate to a center of rotation of a data disk, but which does not require a tall spindle for rotating the disk.

SUMMARY OF THE INVENTION

The above object has been met by a rotary actuator which removes the mechanisms for displacing read/write heads away from an axis of rotation of the heads. The actuator includes a rotary arm having a supported portion and a cantilevered portion. The supported portion has an arcuate bearing surface. The curvature of the bearing surface determines the axis of rotation of the read/write heads. A concentric, second bearing surface is trapped between a pair of pinch rollers to provide precise rotary motion. The supported portion may have a crescent shape, for which the outer surface acts as the first arcuate bearing surface. A drive roller is in frictional contact with the outer surface.

The cantilevered portion of the rotary arm is a radially inward portion, relative to the virtual rotational axis determined by the curvature of the first arcuate bearing surface. The read/write heads are mounted to the cantilevered portion. Preferably, the heads are on a side of the rotational axis that is opposite to the supported portion. The rotational axis is referred to herein as a "cantilevered" axis or a "virtual" axis, since the structure that determines its location is disposed elsewhere, in an analogous manner that an optical system forms a virtual image. This provides an arcuate path of head displacement that corresponds to the path to be followed by heads in the end use of the disk. While the present invention may be used in other applications, it is particularly adapted to use with testing equipment of data disks, such as magnetic disks.

A stepper motor is employed to provide minute movement of the read/write heads. Because the motor and the arcuate bearing surfaces that determine the movement of the read/write heads are spaced apart form the rotational axis, the rotational axis is cantilevered over the structure for driving a disk spindle. In practice, the rotational axis can be brought to a point in which it intersects the disk itself.

An advantage of the present invention is that a spindle having a short length may be employed in rotating the disk relative to the rotary actuator. A short spindle is less likely to introduce spin errors that would adversely affect the recording and the reading of data. Thus, in the testing of data disks, equipment-induced errors would be less likely to occur, thereby decreasing the possibility that test errors will reduce the manufacturing yield of the disks. Another advantage of the present invention is that because the rotary arm is longer than the path that the read/write heads follow would indicate, the heads can easily be adjusted or removed without interference from a number of surrounding pivot or drive elements.

BEST MODE FOR CARRYING OUT THE INVENTION

Figure 1:
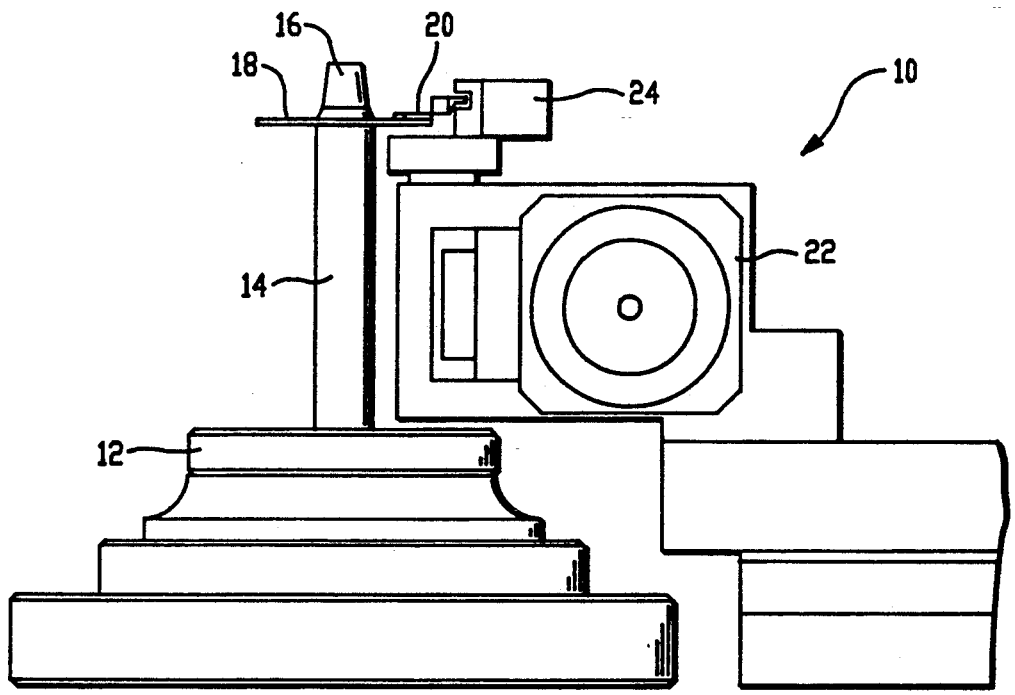
FIG. 1 is a side view of a rotary actuator in accordance with the prior art.

With reference to FIG. 1, a prior art rotary actuator 10 is shown adjacent to an air bearing assembly 12 for rotating a spindle 14. A locking device 16 captures a hard disk 18 to the spindle. The locking device centers and clamps the disk for rotation with the spindle.

As noted above, the trend is toward reducing the size of magnetic memory disks. Previously, the outside diameter of disks easily extended beyond the outside diameter of an air bearing assembly 12, such as the one shown in FIG. 1. This allowed the portion of the rotary actuator 10 that drives and pivots a read/write head 20 to be located adjacent to the air bearing assembly. However, with the reduction of dimensions of disks 18, positioning the head drive mechanism laterally adjacent to the air bearing assembly is made more difficult. The disk 18 of FIG. 1 may be a magnetic disk having an outside diameter of 34 mm, requiring a prior art rotary actuator 10 to be positioned between the disk and the air bearing assembly 12 in order to achieve the desired arcuate path of head 20 movement across the disk. The arcuate path is determined by the placement of the axis of head movement and by the length of the arm that supports the head. For small geometry disks, the rotational axis of the heads must be near the rotational axis of the spindle 14.

The rotary actuator 10 includes a stepper motor 22 and includes a rotary arm pivot assembly 24. The spindle 14 must have a length that is sufficiently great to accommodate placement of the stepper motor 22 between the small diameter disk 18 and the air bearing assembly 12. A long spindle will increase the adverse effect of any spin errors initiated by an air bearing assembly. Thus, it would be advantageous to remove the stepper motor 22 from between the disk and the air bearing assembly. This can be achieved by utilizing a linear actuator, but preferably the disk 18 is tested in the same manner as it will be used in final assembly. Therefore, test equipment using rotary action is desired.

Another difficulty with the assembly of FIG. 1 regards head loading mechanisms. Because of the bulk of the prior art rotary actuator 10, mechanisms for bringing the read/write head 20 into and out of magnetic communication with the disk 18 must remain small, or nonexistent. Thus, refurbishing or replacing the magnetic head is made difficult.

Figure 2:
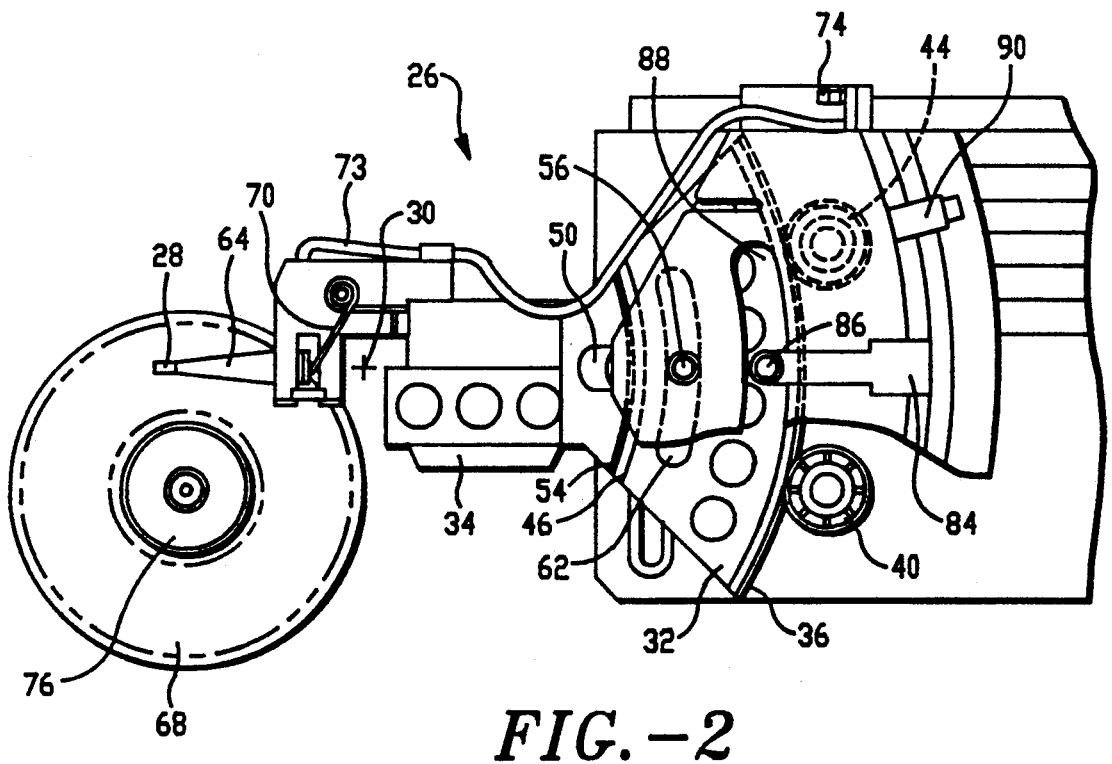
FIG. 2 is a top view of a rotary actuator having a virtual rotational axis in accordance with the present invention.
Figure 3:
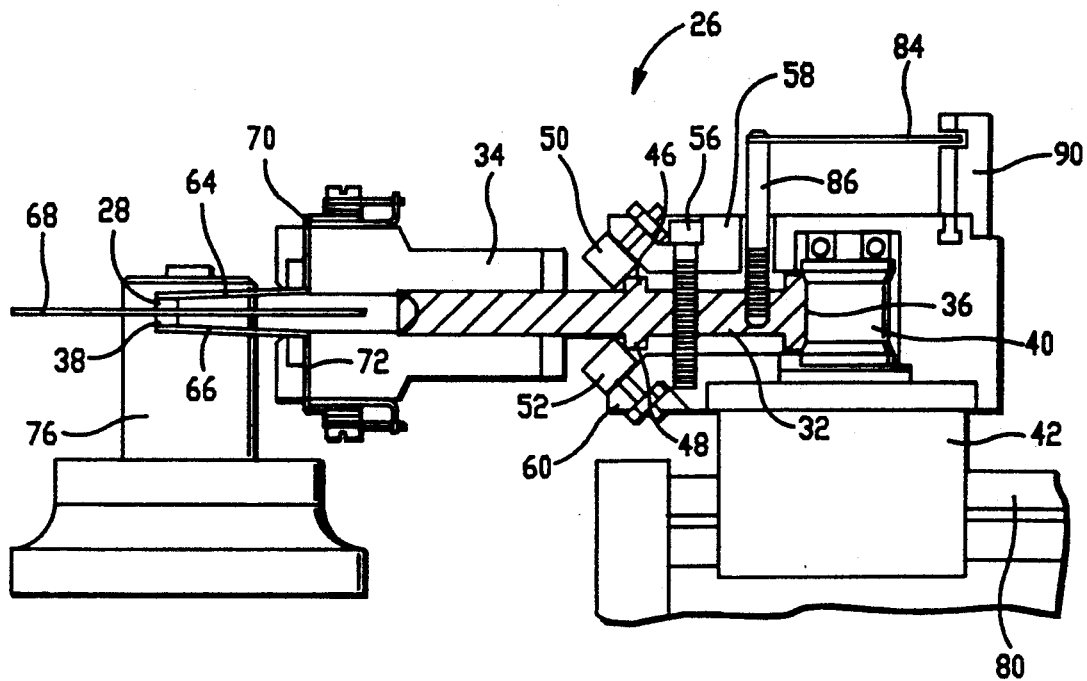
FIG. 3 is a side view of the rotary actuator of FIG. 2.

Referring now to FIGS. 2 and 3, the rotary actuator 26 of the present invention includes a drive mechanism on one side of an axis of rotation and a read/write head 28 on the opposite side of the axis of rotation. In operation, the read/write head follows an arcuate path about an axis that does not include pivot-related structure at the axis. That is, the axis is a "virtual" rotational axis, shown at marking 30 in FIG. 2.

The actuator 26 includes a rotary arm having a supported portion 32 and a cantilevered portion 34. The supported portion 32 has a crescent shape and includes an arcuate bearing surface 36. The curvature of the arcuate bearing surface determines the position of the rotational axis 30 displacement of the two read/write heads 28 and 38. A driver roller 40 that is in frictional contact with the bearing surface 36 causes displacement of the rotary arm and its supported heads 28 and 38. The driver roller 40 is driven by a stepper motor 42 that is conventional in the art. An idler roller 44, shown in phantom, also contacts the bearing surface 36.

The supported portion 32 of the rotary arm includes a pair of protrusions 46 and 48 that are in contact with pinch rollers 50 and 52. As shown in FIG. 2, but not in FIG. 3, the protrusions each include a flattened area 54 that is parallel to the surface of the associated pinch roller. The flattened area functions as a bearing surface. The protrusions 46 and 48 define a curvature that is concentric with the arcuate bearing surface 36 at the end of the supported portion 32. The triangulation of support provided by the pinch rollers 50 and 52 and the driver and idler rollers 40 and 44 ensures a precise rotary motion about the virtual rotational axis 30.

A tensioning bolt 56 extends from an upper frame plate 58 to a lower frame plate 60 that support the pinch rollers 50 and 52. The tensioning bolt is externally threaded and is received within an internally threaded bore of the lower frame plate. By rotating the tensioning bolt, the pressure of the pinch rollers against the protrusions 46 and 48 can be varied. As best seen in FIG. 2, the tensioning bolt 56 passes through an arcuate opening 62 in the supported portion 32 of the rotary arm, thereby allowing the rotary arm to be moved freely without interference by the tensioning bolt.

The cantilevered portion 34 of the rotary arm includes a head load assembly that allows adjustment in X and Y axes to reposition the read/write heads 28 and 38 with respect to the virtual rotational axis 30. Thus, the actuator of FIGS. 2 and 3 permit a user to test a variety of different sized magnetic disks. The heads 28 and 38 are supported on flexures 64 and 66. While the heads can be loaded and unloaded relative to a magnetic disk 68 in any of a variety of ways, a preferred embodiment is described in U.S. Pat. No. 4,862,302 to Ekhoff. The load position of the flexures 64 and 66 brings the heads into data transfer engagement with the magnetic memory disk 68. The heads are moved between a load and an unload position by the bending of the flexures. Return springs 70 and 72 each exert a force on the assembly to bias the heads into the unload position. This bias is selectively overcome by inflation of a gas impermeable elastic bladder, not shown, made of a lightweight material. A pneumatic hose 73 selectively channels air to each elastic bladder during operation of the actuator 26. Optionally, a second pneumatic hose may be connected to a fitting 74, shown in FIG. 2, and independently connected to the head load assembly so that the heads 28 and 38 may be pivoted separately.

Because the rotational axis 30 is spaced apart from the structure that defines its location, the axis can be located near to a spindle 76 that supports and drives the disk 68 without requiring use of a long spindle that would potentially create spin errors in the testing of the disk.

Figure 4:
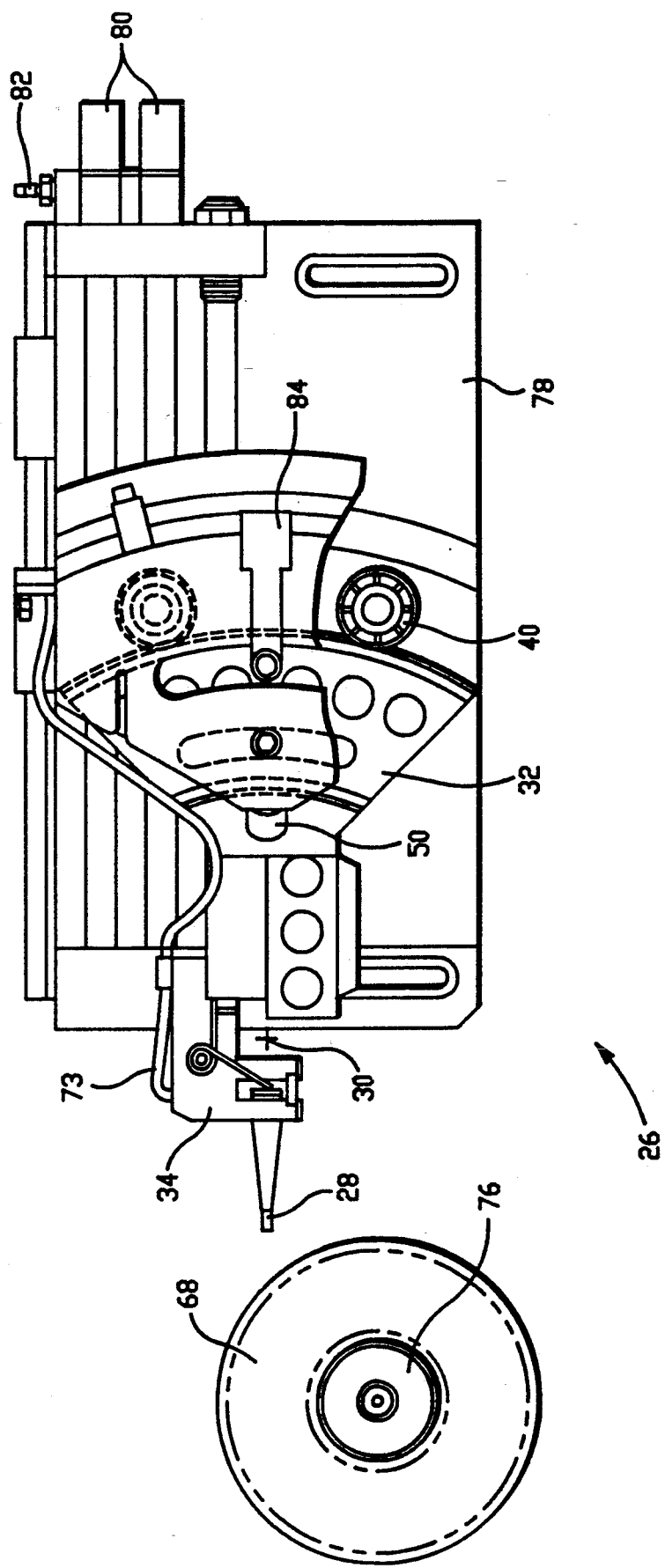
FIG. 4 is a top view of the rotary actuator of FIG. 2 mounted for linear movement.

Referring now to FIG. 4, the rotary actuator 26 is mounted for linear movement, as well as rotational movement about the virtual axis 30. The actuator is fixed to a pneumatic slide 78 having cylindrical slide bars 80. The pneumatic slide permits staging of the actuator in and out of position relative to the disk 68. The actuator is pneumatically drawn to the position shown in FIG. 4, whereafter the disk can be robotically removed and replaced with a second disk to be tested. A fitting 82 is shown. In use, the fitting 82 is connected to a source of air pressure for operation of the pneumatic slide.

In operation, a disk 68 is supported on a spindle 76 and is locked in position relative to the spindle. The actuator 26 is then moved forwardly toward the disk along the slide bars to a position in which the read/write heads 28 and 38 are on opposite sides of the disk. Pneumatic pressure is applied via hose 73 to bring the heads into a load position in data transfer relationship with the disk. This load position is shown in FIGS. 2 and 3.

The stepper motor 42 swings the supported portion 32 of the rotary arm ±15° relative to the position shown in FIGS. 2 and 3. The motor is capable of highly accurate positioning, typically moving at 25,000 steps for a single revolution. An optical encoding system is employed to verify the positional accuracy of the heads. The encoding system includes a flag 84 that is fixed to the rotary arm by a bolt 86. An arcuate opening 88 within the upper frame plate 58 allows free movement of the bolt 86 and flag 84 as the crescent-shaped supported portion 32 is rotated around the axis 30. A number of optical sensors 90 are located to determine the position of the flag 84, and therefore the rotary arm. When the flag passes between an optical sensor, the light path is interrupted. The interruption triggers a signal to a controller, not shown.

Figure 5:
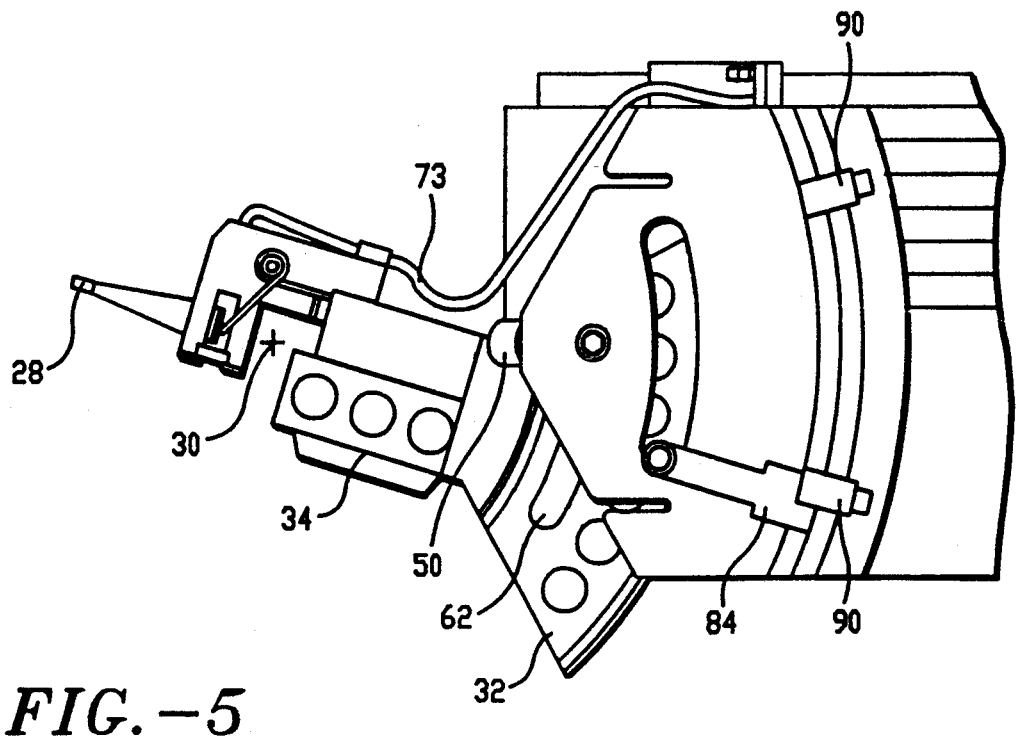
FIG. 5 is a top view of the rotary actuator of FIG. 2, with the read/write heads pivoted in a clockwise direction about the virtual rotational axis.

FIG. 5 shows the read/write head 28 rotated its maximum 15° about the axis 30. The path followed by the head 28 is ideally the same path that is to be followed by a read/write head in the end use of magnetic disks to be tested by the present invention. While the actuator has been described and illustrated as having the magnetic heads on a side of the rotational axis 30 opposite to the drive mechanism, this is not critical. However, this is the preferred embodiment since it further distances the drive mechanism from the area of a disk to be written upon or read. The greater the distance, the easier it is to minimize the structure between the disk and air bearing assembly for driving the disk. The present invention is best suited for use with the testing of disks, such as optical and magnetic disks, but this is not critical. Alternatively, the actuator can be employed in other applications.

I claim:

1. An actuator for use with a data disk comprising,
    a rotary arm having a supported portion and having a cantilevered portion,
    mounting means coupled to said supported portion of said arm to secure said arm for rotation about a virtual rotational axis, said mounting means being stationary with respect to said arm as said arm undergoes said rotational motion, said virtual axis being located within a region spanned by said cantilevered portion, said region being defined along said cantilevered portion, and
    means for coupling a transducer to said cantilevered portion of said arm, thereby securing said transducer for displacement along an arcuate path when said arm is moved about said virtual rotational axis.

2. The actuator of claim 1 wherein said supported portion of said arm includes a first arcuate bearing surface having a radius of curvature to define said virtual rotational axis, said actuator further comprising drive means in frictional contact with said first arcuate bearing surface.

3. The actuator of claim 2 wherein said supported portion of said arm includes a second arcuate bearing surface, said first and second arcuate bearing surfaces having concentric curvatures about said virtual rotational axis.

4. The actuator of claim 3 wherein said mounting means includes a pinch roller in contact with said second arcuate bearing surface.

5. The actuator of claim 2 wherein said drive means includes a motor-driven roller.

6. The actuator of claim 1 wherein said means for coupling said transducer fixes said transducer such that said virtual rotational axis is positioned between said transducer and said supported portion of said arm.

7. The actuator of claim 1 further comprising means for displacing said arm along a linear path.

8. An actuator for use with a data disk comprising,
    a support assembly having an arcuate bearing surface, said arcuate bearing surface having a curvature about an axis of rotation,
    drive means in contact with said arcuate bearing surface for swinging said support assembly about said axis of rotation,
    a read/write head coupled to an end of said support assembly for displacement about said axis of rotation, and
    said read/write head and said drive means being diametrically disposed along said support assembly such that said axis of rotation lies therebetween.

9. The actuator of claim 8 wherein said drive means includes a stepper motor.

10. The actuator of claim 8 wherein said support assembly includes a crescent-shaped portion and includes a cantilevered portion, said crescent-shaped portion having a curvature about said axis of rotation, said cantilevered portion projecting from said crescent-shaped portion in the direction of said axis of rotation.

11. An actuator for use with a data disk comprising,
    a stepper motor,
    a support member having a first arcuate bearing surface coupled to said stepper motor to be frictionally driven thereby, said support member having a second bearing surface, said first and second bearing surfaces each having a substantially constant radius of curvature, said first arcuate bearing surface having a first diameter, said second arcuate bearing surface having a second diameter, said first diameter being greater than said second diameter,
    a head load means cantilevered from said support member for fixing a read/write head, said support member being mounted to rotate about a virtual axis of rotation when driven by said stepper motor, said virtual axis of rotation being located within a region delimited by said head load means, said first and second arcuate bearing surfaces defining concentric circles, said virtual axis of rotation being the center of said concentric circles, said head load means substantially disposed within an area bounded by said concentric circles.

12. The actuator of claim 11 further comprising a read/write head fixed to said head load means so that said virtual axis lies between said read/write head and said stepper motor.

13. The actuator of claim 11 wherein said support member is a crescent-shaped member.

14. The actuator of claim 11 wherein said support member is mounted between idler rollers disposed between said second bearing surface and said head load means.

15. The actuator of claim 11 further comprising means for linearly moving said stepper motor and said head load means.

16. An actuator for use with a data disk comprising,
a support assembly having an arcuate bearing surface having a curvature about an axis of rotation,
drive means in contact with said arcuate bearing surface for swinging said support assembly about said axis of rotation,
a read/write head coupled to an end of said support assembly for displacement about said axis of rotation,
said read/write head and said drive means being diametrically disposed along said support assembly so that said axis of rotation lies therebetween, and
said support assembly is floated between a pair of pinch rollers to suspend a portion of said support assembly positionally corresponding to said axis of rotation.

17. The actuator of claim 16 wherein said pair of pinch rollers contact first and second arcuate surfaces on opposite sides of said support assembly.

* * * * *